United States Patent [19]

Umetsu

[11] 4,244,591
[45] Jan. 13, 1981

[54] DEVICE FOR PROTECTING THE OPERATING SECTION OF A CAMERA FROM WATER DROPS AND DUST

[75] Inventor: Junji Umetsu, Kita, Japan

[73] Assignee: Asahi Kogaku Kogyo Kabushiki Kaisha, Tokyo, Japan

[21] Appl. No.: 74,273

[22] Filed: Sep. 11, 1979

Related U.S. Application Data

[63] Continuation of Ser. No. 911,241, May 30, 1978, abandoned.

[30] Foreign Application Priority Data

May 30, 1977 [JP] Japan .................. 52-69537

[51] Int. Cl.³ .............. F16J 15/10; G03B 17/08; G03B 17/38
[52] U.S. Cl. ............................ 277/212 F; 277/12; 277/171; 354/64; 354/266
[58] Field of Search ............. 277/12, 50, 92, 95, 277/167.5, 171, 212 F; 352/174; 354/64, 266

[56] References Cited

U.S. PATENT DOCUMENTS

| | | | |
|---|---|---|---|
| 2,368,744 | 2/1945 | Carey | 277/171 X |
| 2,477,882 | 8/1949 | Brie | 277/212 F X |
| 2,625,414 | 1/1953 | Kranz | 277/212 F |
| 2,981,168 | 4/1961 | Biedermann et al. | 354/266 |
| 3,013,481 | 12/1961 | Biedermann et al. | 354/266 |
| 3,653,306 | 4/1972 | Takahama | 354/64 |
| 3,950,773 | 4/1976 | Winkler et al. | 354/266 |
| 4,041,507 | 8/1977 | Ko et al. | 354/64 |
| 4,097,878 | 6/1978 | Cramer | 354/64 |

FOREIGN PATENT DOCUMENTS

417254  1/1967  Switzerland ............. 277/212 F

*Primary Examiner*—Robert S. Ward, Jr.
*Attorney, Agent, or Firm*—Sughrue, Rothwell, Mion, Zinn and Macpeak

[57] ABSTRACT

Water- and dust-proof connections between movable components mounted externally on a camera and the camera casing are achieved by using a viscoelastic sheet inserted at one end into either the component or casing and frictionally engaging the other to provide the leak-proof seal.

5 Claims, 3 Drawing Figures

DEVICE FOR PROTECTING THE OPERATING SECTION OF A CAMERA FROM WATER DROPS AND DUST

This is a continuation of application Ser. No. 911,241 filed May 30, 1978 abandoned.

BACKGROUND OF THE INVENTION

This invention relates to a technique in water-drop-proofing (hereinafter referred to merely as "drop-proofing" when applicable) and dust proofing cameras.

In taking pictures in rainy or dusty environments or in water splashes, a conventional camera is unsatisfactory in that the film may be damaged and even the camera itself may be damaged. Thus, the utility of conventional cameras is limited.

The present invention is intended to provide an all-weather camera in which the above-described limitations are eliminated without hindering the operability of the camera; that is, to provide a device for protecting the operating section of a camera from water drops and dust. Furthermore, the protection device also helps to reduce the operating sound of a camera. Therefore, the utility of the device according to the invention is considerably high.

In a conventional method of protecting the operating section a camera from water drops or dust, which is employed in a special photographing camera such as an underwater camera, an "O"-ring is provided between a shaft and a bearing. Accordingly, such a camera needs a large thrust space for using the "O"-ring. Waterproofing between the shaft and the bearing is obtained by employing the "O"-ring against its viscoelasticity and, therefore, friction between the operating shaft and the "O"-ring is increased. As a result, the shaft mobility is hindered, and if the shaft has a self-restoring function, it is necessary to provide a strong spring therefor. This type of internal construction is often unsuitable for ordinary cameras.

SUMMARY OF THE INVENTION

Accordingly, an object of this invention is to eliminate the above-described difficulties; and more specifically to provide a device which protects the operating section of a camera from water drops and dust with a small space without exerting an excessive load on the moving elements of the camera.

These and other objects are achieved by providing in the annular space between the camera operating member and camera casing a viscoelastic sheet slightly larger than the annular space. The sheet is firmly anchored to one or both of the camera operating member and camera casing. If not bonded or embedded at one end, the sheet will, nevertheless, provide a tight leak-proof fit.

DETAILED DESCRIPTION OF THE INVENTION

This invention will be described in detail with reference to its preferred embodiment.

Figure 1:
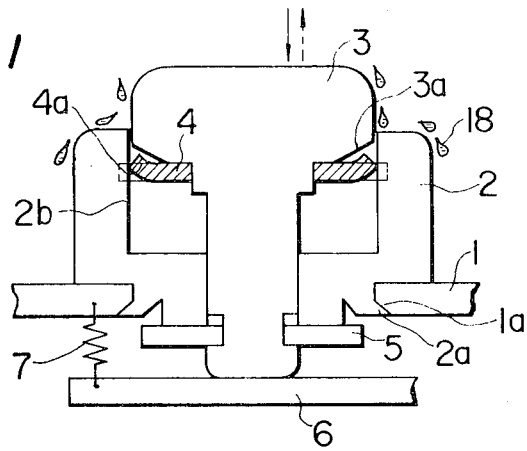
FIG. 1 is a vertical sectional view of a camera button sealed according to the present invention.

Referring to FIG. 1, reference numeral 1 designates an upper decoration board fixedly secured to a camera body (not shown). A shutter button seat 2 and the upper decoration board 1 are formed into one unit by joining the portion 2a of the shutter button seat 2 and the portion 1a of the upper decoration board 1 together by caulking. Reference numeral 3 designates a shutter button which is positioned in place by means of a washer 5 so that it may not be removed from the shutter button seat. A release board 6 is connected to a shutter mechanism (not shown) provided in the camera. A spring is provided between the release board 6 and the upper decoration board 1 so as to push the shutter button 3 upward at all times. Accordingly, the shutter button 3 makes a thrust motion downwardly when pushed by the operator during the shutter release operation and is self-restored by spring 7. Reference numeral 4 designates an annular thin rubber washer which is bonded to the shutter button 3 and frictionally engages the button seat 2. The shutter button 3, as indicated by 3a in FIG. 1, is chamfered for relief of the rubber washer 4. The outer diameter of the rubber washer 4 is made slightly larger than the inner diameter of the button seat 2 and the washer is forcibly inserted into the button seat against its viscoelasticity. With the arrangement shown in FIG. 1, the entering of water drops 18 is prevented both during the thrushing and restoration of the button by a combination of the circumferential portion 4a of the rubber washer 4 and the inner wall 2b of the shutter button seat 2.

Figure 2:
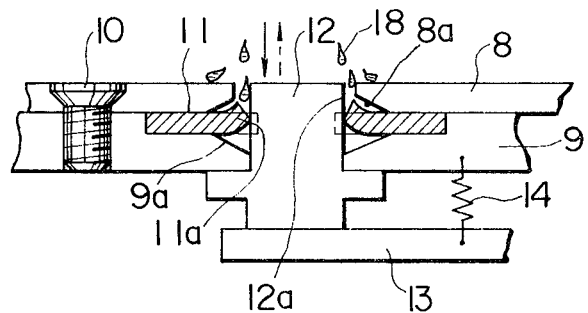
FIG. 2 is a vertical sectional view of a camera button sealed according to a second embodiment of the present invention.

A second embodiment of the present invention is shown in FIG. 2, in which reference numeral 8 designates a decoration board integral with a camera body (not shown), and a bearing board 9 is fixedly secured to the decoration board 8 with a screw 10. A pin 12 is fitted into the bearing board 9, and it is pushed upwardly by means of a spring 14 provided between the bearing board 9 and a locking lever 13. An annular, thin rubber washer 11 is fixedly sandwiched between the decoration board 8 and the bearing board 9. The inner circumference of the washer 11 is made slightly smaller than the diameter of the pin 12 in order to provide a leak-proof fit by stretching the washer. The drop-proof and dust-proof effects are provided by the combination of the outer wall of the pin 12 and the inner wall 11a of the rubber washer 11 and the drop-proofing and dust-proofing effects are perfect even when the pin 12 is making a thrust motion because the flexibility of the rubber washer will permit it to follow the movement of the pin. The portion 8a of the decoration board 8 and the portion 9a of the bearing board 9 are chamfered for relief of the rubber washer 11.

Figure 3:
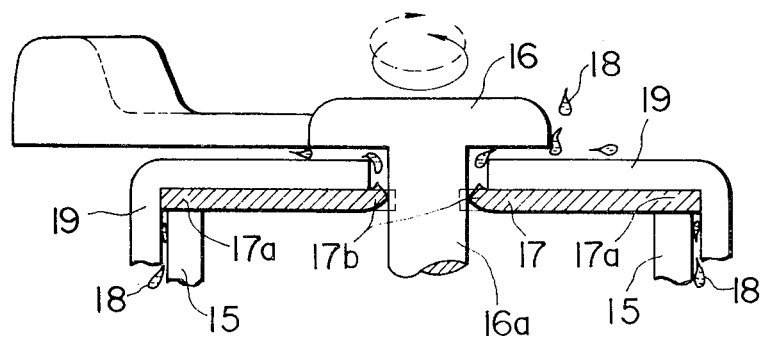
FIG. 3 is a vertical sectional view of a camera winding mechanism sealed according to a third embodiment of the present invention.

Referring to FIG. 3, a third embodiment of this invention includes an upper decoration board 19 fixedly secured to a camera body with screws (not shown), and a winding lever 16 connected to winding mechanism (not shown) in the camera. A rubber sheet 17 is bonded to the upper decoration board 19. The inner diameter of the rubber sheet 17 is made slightly smaller than the diameter of the outer wall 16a of the shaft of the winding lever 16 and the shaft is forcibly inserted into the rubber sheet against the viscoelasticity of the latter. The entering of water drops 18 is prevented by the combination of the outer wall 16a of the shaft of the winding lever 16 and the inner wall 17b of the hole in the rubber sheet similar to the embodiment of FIG. 2. Although the winding lever 16 is formed so as to provide radial motion, the drop-proof and dust-proof effects are perfect even when the winding lever 16 is turned due to the snug fit of the washer. An added advantage of the rubber sheet 16 is that, since the peripheral portion 17a of the rubber sheet 17 is tightly held by securing the upper decoration board 19 to the camera body with screws, the entering of water drops 18 through a space between the camera body 15 and the upper decoration board 19 is prevented. Thus, the same effect as that of the rubber washer for the shutter release button can be obtained readily by using the rubber sheet for the winding lever.

The viscoelastic sheet is employed between the external case member and the operating member of the camera for the purpose of drop-proofing and dust-proofing as described above. The thickness of the viscoelastic sheet can be made thinner than that of an "O"-ring and, therefore, the operating mechanism can be made smaller. Furthermore, the viscoelastic sheet can be readily manufactured by blanking a sheet material. An additional advantage of the present invention is that an "O"-ring requires a very tight sliding fit between adjacent parts and, therefore, must be manufactured within close tolerances while the viscoelastic sheet depends on its flexing capability to provide the seal and, therefore, the dimensional accuracies need not be as strict and the friction between adjacent parts may be much less. Thus, the device according to the present invention for protecting the operating section of the camera from water drops and dust can be easily manufactured. Unlike the "O"-ring, it is not possible with the viscoelastic sheet to obtain a water-proof effect under high pressure. However, for ordinary cameras for taking pictures in an ordinary manner, the device according to the present invention is sufficiently effective in a rainy or dusty environment.

As is apparent from the above description, according to this invention, by utilizing the bending of a viscoelastic material the device for protecting the operating section of the camera from water drops and dust is realized within a small space without exerting excessive friction on the thrusting and radially moving elements. Furthermore, it goes without saying that the technical concept of this invention can be applied not only to the moving elements on the camera body such as a shutter button, a release button and a winding lever, but also to a lens barrel and the moving elements of the accessories of a camera.

What is claimed is:

1. A seal for protecting the interior of a camera from water drops and dust, said seal of the type comprising an external casing member of said camera, an operating member outside of said casing member for controlling a camera function, said operating member passing through an opening in said external casing member to form a gap therebetween, and a sealing means for sealing said gap, wherein the improvement comprises:

said sealing means comprising a viscoelastic sheet, having a substantially rectangular cross-section and an axial thickness which is small in relation to its radial thickness, fixedly secured to one of said members and tightly contacting the entire periphery of the other of said members around the entire periphery of said other member within said gap.

2. A seal as claimed in claim 1, wherein said operating member includes a shaft and wherein said sealing means is an annular viscoelastic sheet fixed at its outer diameter to the camera casing and having an inner diameter in its unstressed state which is slightly smaller than the diameter of said shaft.

3. A seal as claimed in claim 1, wherein said sealing means is an annular viscoelastic sheet fixed at its inner periphery to said operating member and having an outer diameter, in its unstressed state, larger than the inner diameter of the opening.

4. A seal as claimed in claims 1, 2 or 3, wherein said operating member is axially movable.

5. A seal as claimed in claims 1 or 2, wherein said operating member is rotatable.

* * * * *